US008917646B2

(12) United States Patent
Bhogal et al.

(10) Patent No.: US 8,917,646 B2
(45) Date of Patent: Dec. 23, 2014

(54) DETECTING AND PROCESSING CORRUPTED VIDEO RECORDINGS

(75) Inventors: Kulvir S. Bhogal, Fort Worth, TX (US); Gregory J. Boss, American Fork, UT (US); Rick A. Hamilton, II, Charlottesville, VA (US); Brian M. O'Connell, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 2029 days.

(21) Appl. No.: 11/875,313

(22) Filed: Oct. 19, 2007

(65) Prior Publication Data

US 2009/0106804 A1 Apr. 23, 2009

(51) Int. Cl.
| | |
|---|---|
| *H04H 20/71* | (2008.01) |
| *H04N 7/173* | (2011.01) |
| *G06F 3/00* | (2006.01) |
| *G06F 13/00* | (2006.01) |
| *H04N 5/455* | (2006.01) |
| *H04L 1/00* | (2006.01) |
| *H04N 21/258* | (2011.01) |
| *H04N 21/4147* | (2011.01) |
| *H04N 21/647* | (2011.01) |
| *H04N 21/845* | (2011.01) |
| *H04L 1/18* | (2006.01) |

(52) U.S. Cl.
CPC .............. *H04N 7/17318* (2013.01); *H04L 1/18* (2013.01); *H04L 1/0061* (2013.01); *H04N 21/25816* (2013.01); *H04N 21/4147* (2013.01); *H04N 21/64776* (2013.01); *H04N 21/8456* (2013.01)
USPC .............................. 370/312; 725/64; 725/121

(58) Field of Classification Search
None
See application file for complete search history.

(56) References Cited

U.S. PATENT DOCUMENTS

| | | | |
|---|---|---|---|
| 5,808,662 A | 9/1998 | Kinney et al. | |
| 6,381,608 B1 | 4/2002 | Savoie | |
| 6,625,385 B2 | 9/2003 | Collin et al. | |
| 6,662,329 B1 | 12/2003 | Foster et al. | |
| 7,113,773 B2 * | 9/2006 | Quick et al. ............... | 455/414.3 |
| 7,114,172 B2 | 9/2006 | Lord | |
| 7,246,367 B2 | 7/2007 | Livonen | |
| 7,386,219 B2 | 6/2008 | Ishige | |
| 7,669,219 B2 | 2/2010 | Scott, III | |
| 2002/0087661 A1 | 7/2002 | Matichuk et al. | |
| 2003/0016673 A1 * | 1/2003 | Pendakur et al. ............. | 370/394 |
| 2003/0056220 A1 | 3/2003 | Thornton et al. | |
| 2003/0086694 A1 | 5/2003 | Davidsson | |
| 2003/0099462 A1 * | 5/2003 | Matsugami ..................... | 386/83 |
| 2003/0156827 A1 | 8/2003 | Janevski | |
| 2003/0219228 A1 * | 11/2003 | Thiagarajan et al. ........... | 386/83 |

(Continued)

OTHER PUBLICATIONS

Office Action in U.S. Appl. No. 11/875,370 mailed Nov. 21, 2011.

*Primary Examiner* — Christopher Crutchfield
(74) *Attorney, Agent, or Firm* — Mitch Harris, Atty at Law, LLC; Andrew M. Harris; John R. Pivnichny

(57) ABSTRACT

Embodiments of the invention include a method that comprises recording broadcasted television content and determining if one or more segments of the content is corrupted. The method can also present a notification if the content is corrupted, where the notification can include indicia such as a pop-up window, an icon or symbol in a program guide screen or program recorded content screen, and/or an indicator on the DVR unit. The method can also acquire uncorrupted content to replace one or more segments of the corrupted content.

17 Claims, 8 Drawing Sheets

(56) References Cited

U.S. PATENT DOCUMENTS

| | | |
|---|---|---|
| 2004/0151474 A1* | 8/2004 | Suh .................................. 386/83 |
| 2005/0246749 A1* | 11/2005 | Tsuruga et al. ................ 725/100 |
| 2006/0052067 A1* | 3/2006 | Singh et al. .................... 455/108 |
| 2006/0062147 A1* | 3/2006 | Dougall et al. ................ 370/230 |
| 2006/0174293 A1 | 8/2006 | Ducheneaut |
| 2006/0288361 A1* | 12/2006 | White Eagle et al. .......... 725/32 |
| 2007/0040936 A1 | 2/2007 | Park |
| 2007/0168708 A1* | 7/2007 | McCuller .......................... 714/6 |
| 2007/0189708 A1 | 8/2007 | Lerman et al. |
| 2007/0283403 A1 | 12/2007 | Eklund et al. |
| 2008/0010518 A1 | 1/2008 | Jiang et al. |
| 2008/0086743 A1* | 4/2008 | Cheng et al. ..................... 725/38 |
| 2008/0189380 A1 | 8/2008 | Bosworth |
| 2008/0313402 A1 | 12/2008 | Wong et al. |
| 2009/0044216 A1 | 2/2009 | McNicoll |
| 2009/0074380 A1 | 3/2009 | Boston et al. |
| 2009/0199031 A1* | 8/2009 | Zhang et al. ................... 713/323 |
| 2009/0220216 A1 | 9/2009 | Marsh et al. |
| 2009/0263101 A1 | 10/2009 | Rudolph et al. |
| 2010/0107104 A1 | 4/2010 | Bruce et al. |
| 2011/0030012 A1 | 2/2011 | Diaz Perez |

* cited by examiner

DETECTING AND PROCESSING CORRUPTED VIDEO RECORDINGS

RELATED MATTERS

This application is related to U.S. patent application Ser. No. 11/875,370 filed Oct. 19, 2007.

TECHNICAL FIELD

Embodiments of the invention(s) generally relate to the field of correcting corruption in recorded content, and particularly relates to methods of detecting, correcting, and notifying a user of corrupted recordings, such as those commonly occurring due to inclement weather or power outages.

BACKGROUND

A digital video recorder (DVR) (a.k.a. personal video recorder or PVR) is a device that records audio and video content in a digital format to a disk drive or other medium. DVRs include stand-alone set-top boxes and software for personal computers, where the software enables content capture and playback to and from disk. DVRs often provide several enhancements to similar devices such as VCRs, including convenient "time shifting". Additionally, some DVRs provide desirable features, such as pausing live TV, instant replay of interesting scenes, chasing playback, and skipping advertising. Most DVRs use MPEG format for encoding analog video signals.

DVRs can record corrupted content for a variety of reasons. For example, inclement weather can cause poor reception of satellite television broadcasts. As a result, DVRs may record corrupted or poor quality content. DVRs that are not connected to satellite dishes can experience other problems, such as power outages, poor signal quality, etc.

SUMMARY

Embodiments of the invention include a method that comprises recording broadcasted television content. The method can also determine if one or more segments of the content is corrupted. The method can also present a notification if the content is corrupted, where the notification can include indicia such as a pop-up window, an icon or symbol in a program guide screen or program recorded content screen, and/or an indicator on the DVR unit. The method can also acquire uncorrupted content to replace one or more segments of the corrupted content.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. In other instances, well-known instruction instances, protocols, structures and techniques have not been shown in detail in order not to obfuscate the description.

Figure 1:
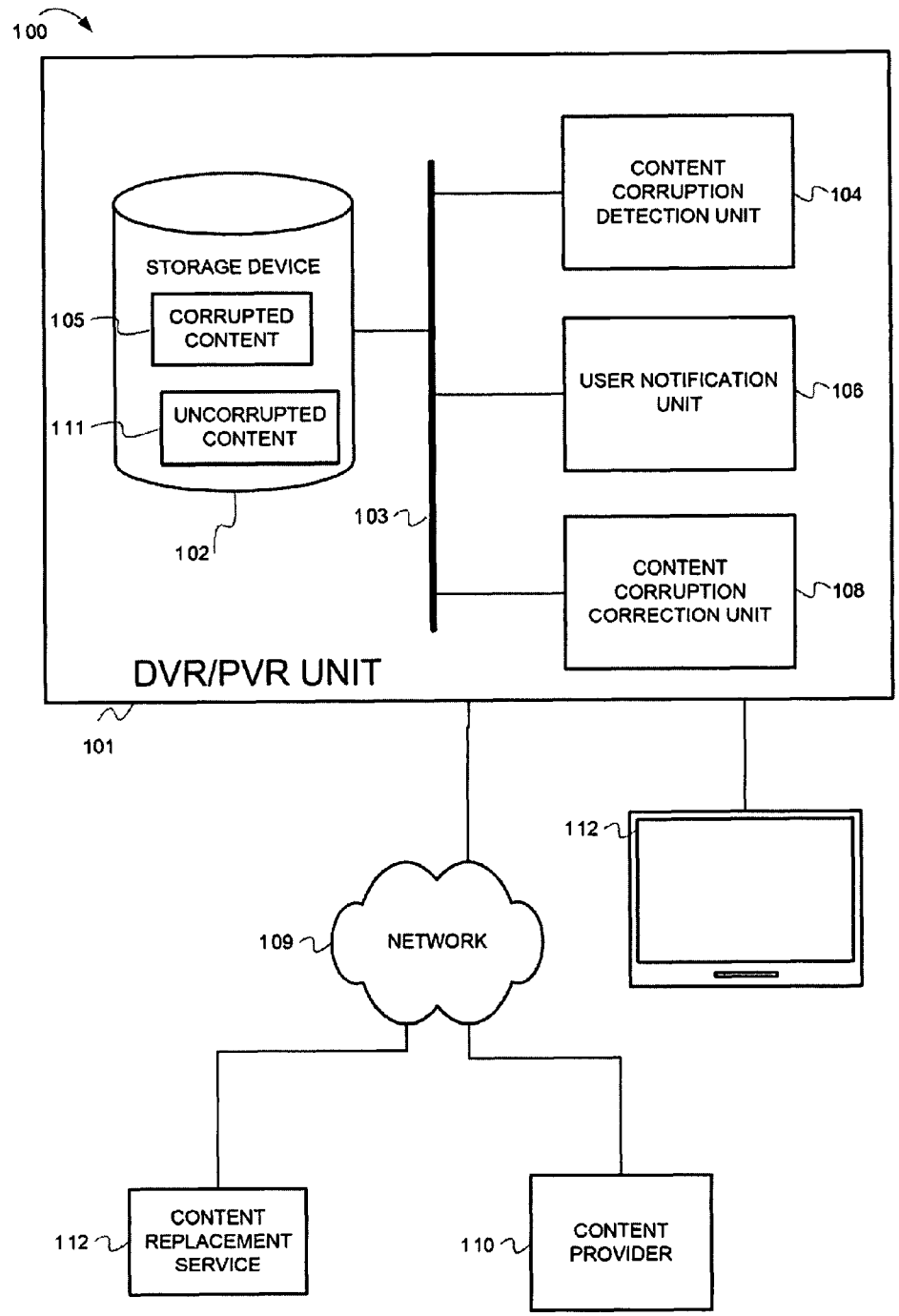
FIG. 1 depicts a block diagram illustrating the configuration of the content delivery system with a content provider serving as a provider of uncorrupted content in an embodiment of the invention.

FIG. 1 illustrates a content delivery system 100, according to some embodiments of the invention. The content delivery system includes a DVR unit 101, display device 112 (e.g., television), network 109, content provider 110, and content replacement service 112. The content provider 110 can provide television content via a cable television infrastructure (e.g., optical fiber, coaxial cables, etc.) or other infrastructures, such as digital subscriber lines (DSL). In FIG. 1, the DVR unit 101 includes a storage device 102, content corruption detection unit 104, user notification unit 106, and content corruption correction unit 108, all of which are connected via a bus 103. Although FIG. 1 shows the DVR's components connected via a bus 103, the components can be connected using other technologies (e.g., software interfaces). The storage device 102 includes uncorrupted content 111 and corrupted content 105.

Although not shown in FIG. 1, the DVR unit 101 includes components for recording and presenting content (e.g., video decoding logic, read/write logic, video tuner(s), etc.) Furthermore, any of the components shown herein can include hardware, firmware, and/or machine-readable data storage media including instructions for performing the operations described herein. Machine-readable data storage media includes any mechanism that stores information in a form readable by a machine (e.g., a wagering game machine, computer, etc.). For example, tangible machine-readable data storage media includes read only memory (ROM), random access memory (RAM), magnetic disk storage media, optical storage media, flash memory machines, etc.

In some embodiments of the invention, the content corruption detection unit 104 utilizes a variety of methods to detect corrupted content in the storage device 102. These methods can include reduced signal strength detection, power outage detection, digital block detection, and user demarcation. Furthermore, in some embodiments, the user notification unit 106 can notify the user that a recording is corrupted upon detection by the content corruption detection unit 104. Example notifications can include an indicator on the DVR unit itself indicating that a recording includes corrupted content, a graphical user interface indicating that one or more recordings are corrupted, and modified icons that indicate corrupted content has been recorded. A network 109 connects the DVR unit 110 to the content provider 110 and content replacement service 112.

Figure 2:
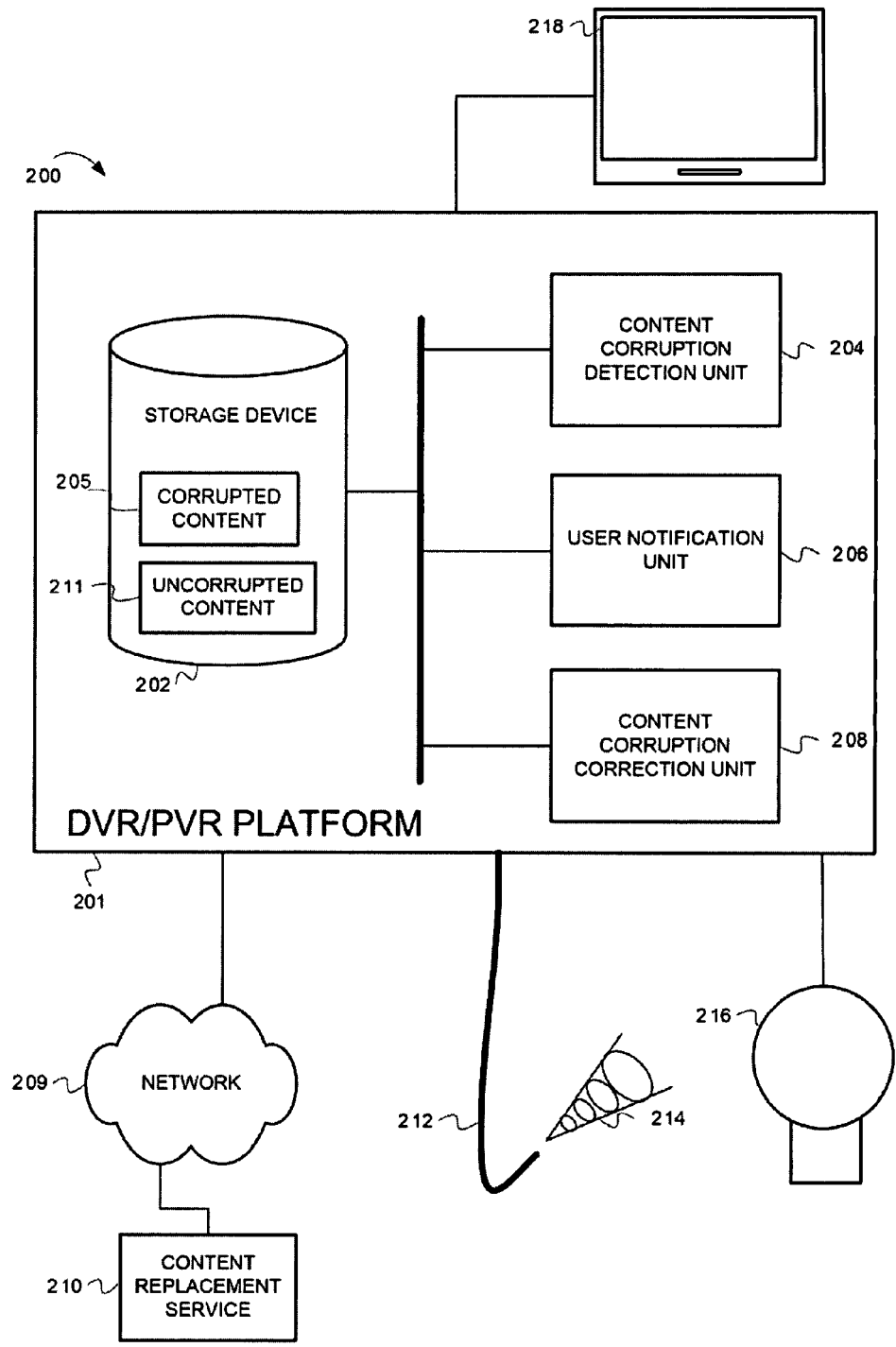
FIG. 2 depicts a block diagram illustrating the configuration of the content delivery system with a satellite serving as a provider of uncorrupted content in an embodiment of the invention.

FIG. 2 illustrates another content delivery system 200, according to some embodiments of the invention. The content delivery system 200 includes a DVR unit 201, display device 218, network 209, content replacement service 210, and satellite dish 216. In FIG. 2, the DVR unit 201 includes a storage device 202 that includes uncorrupted content 211 and corrupted content 205. The DVR unit 201 also includes a content corruption detection unit 204, user notification unit 206, and content corruption correction unit 208, all of which are connected via a bus 203. Although FIG. 1 shows the DVR's components connected via a bus 103, the components can be connected using other technologies (e.g., software interfaces). Also, the DVR unit 101 can include components (not shown) for recording and presenting content (e.g., video decoding logic, read/write logic, video tuner(s), etc.).

In some embodiments of the invention, the content corruption detection unit 204 can utilize a variety of methods to detect the corrupted content 205 in the storage device 202. The corrupted content 205 can include "dead" (unviewable) content. The DVR unit 201 may record unviewable content by can errantly recording from a channel that is not carrying content supplied by the content provider 110. When presented, the dead content may cause the display device 112 to show a blank screen, monochromatic screen, or white noise. The corruption detection unit's methods for detecting corrupted content can include pixel monitoring, white noise detection, and digital block detection. Furthermore, in some embodiments, the user notification unit 206 can notify the user that a recording is corrupted upon detection by the content corruption detection unit 204. Example notifications include indicia appearing on the DVR unit itself, icons appearing in graphical user interfaces, pop-up windows appearing in graphical user interfaces, etc.

The DVR unit 201 also includes a transmission unit 212 that can send wireless signals 214 (e.g., infrared (IR) signals, radio frequency (RF) signals, etc.) to reprogram a satellite dish 216. In the embodiment in FIG. 2, the transmission unit 212 includes a wire through which it transmits the wireless signals. A network 209 connects the DVR unit 201 to a content replacement service 210

System Operations

This section describes operations performed by some embodiments of the systems described above. In certain embodiments, the operations can be performed by executing instructions residing on machine-readable content (e.g., software), while in other embodiments, the operations can be performed by a combination of software, hardware, and/or other logic (e.g., firmware). In some embodiments, the operations can be performed in series, while in other embodiments, one or more of the operations can be performed in parallel. Moreover, some embodiments can perform less than all the operations shown in the Figures.

Figure 3:
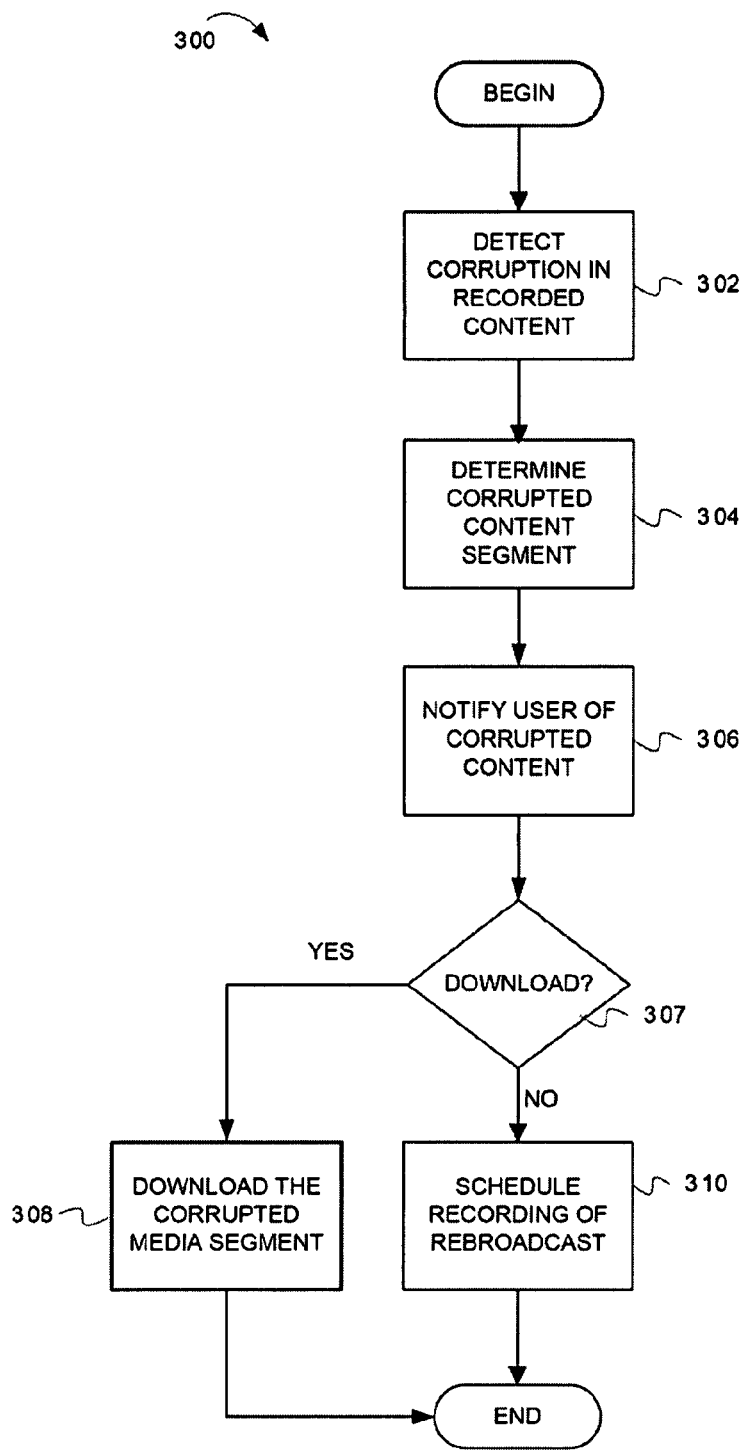
FIG. 3 depicts a flowchart illustrating the operation of the DVR unit according to some embodiments of the invention.

FIG. 3 is a flow diagram illustrating operations of a DVR unit, according to some embodiments of the invention. In FIG. 3, the flow 300 begins at block 302, where the DVR unit 101 detects corrupted content in the storage device 102. The flow continues at block 304. At block 304, the content corruption detection unit 104 identifies the corrupted content segment.

The methods of detecting and identifying can include one or more of the following:

Reduced Signal Method—The reduced signal strength detection method marks the recording as corrupted if the signal strength decreases below a threshold while recording. The start of reduced signal strength and duration of lowered signal strength can be stored to identify the corrupted content segment.

Content Provider Method—Using the content provider notification method, a content provider 110 can detect potentially corrupted recordings through customer complaints or automated systems that analyze region specific weather data. If the content provider 110 detects conditions sufficient to cause corrupted recordings, the provider may notify the DVR unit 101 that content recorded during a particular time window may be damaged. The corruption detection unit 108 can store an indication of the time window.

Power Outage Detection Method—A power outage for a DVR, during a recording, results in corrupted media wherein the recording is missing the segments from when the power outage occurred until the DVR was restarted and capable of recording again. In the power outage detection method, the content corruption detection unit 104 detects a power outage by comparing the DVRs recording list against the last known time the system was functional before the most recent startup. The duration of the corruption is determined by the time period between the DVRs last known functional time prior to restart and the time when the DVR resumed recording.

User Demarcation Method—In the user demarcation method, the content corruption detection unit 104 detects a corrupted content segment by allowing a user to identify corrupt content through a user interface. The user interface can include pop-up menus and other graphics that allow users to identify start and end points of in a segment of recorded content. The start and end points demarcate the corrupted content.

Mismatch Checksum Detection Method—In the mismatch checksum detection method, the DVR's content corruption detection unit 101 can calculate a checksum as content is recorded. The DVR unit's checksum is compared to a checksum given by the content provider 110. If the checksums do not match, the recording is corrupted. If a checksum error occurs, the content corruption detection unit 104 and content provider 110 may perform a rolling checksum to detect which parts of the recording are corrupted. The start and duration for the corruption consist of the area of the recording with disparate rolling checksum values. In situations where the mismatch checksum method is inadequate due to an analog television broadcast that gives an imprecise measurement of signal, the content corruption detection unit 104 can compare the recorded length of the show with the published length, which would be further broken up into show lengths and commercial lengths. If there is corruption to a non-critical part of the recording (e.g. a commercial or intermittent black space), the content corruption detection unit 104 can decide whether the recording is acceptable. If a critical portion of the show is not matching the proper length, the content corruption detection unit 104 can replace the corrupted segment.

Silent and White Noise Method—In the silent and white noise detection method, the content corruption detection unit 104 measures the silence resulting from signal loss for an extended time period or the presence of white noise as indications of corrupted content.

The flow continues at block 306, where the DVR unit's notification unit 106 presents a notification about the corrupted content. For example, the notification unit 106 can notify users about corrupted content via pop-up screens, indicators on the DVR unit itself, and/or icons in the recorded content list (e.g., see FIG. 4). Once the user is notified of the corrupted content, the DVR unit 101 can choose whether to download the corrected content segment of the corrupted content recording (see block 307).

If the DVR Unit 101 chooses to download the corrected content segment of the corrupted content recording, the flow continues at block 308. At block 308, the corrected content segment may be downloaded from a web enabled content repository via a web service, according to some embodiments of the invention. In some embodiments, the content corruption correction unit 108 can alter the recording by replacing corrupted segments with the downloaded segments. In other embodiments, the content corruption correction unit 108 can store the corrupted content and location of downloaded content segments as metadata and playback the downloaded content segments at the times described in the metadata. Therefore, the system 300 can seamlessly replace corrupted content segments with downloaded segments. From block 308, the flow ends.

If the DVR unit 101 chooses not to download the corrected content segment of the corrupted recording, the flow continues at block 310. At block 310 the DVR unit 101 schedules a recording of a rebroadcast of the original content. For example, since west coast broadcasts run hour(s) behind those in the east, the corrupt segment can be recorded during the west coast showing of the originally recorded content. Alternatively, the DVR unit 101 can analyze a content guide to discover if and when the content is being rebroadcasted and automatically record during that rebroadcast. Some embodiments may replace die entire recording, while others may opt to only rerecord the sections damaged in the original recording. From block 310, the flow ends.

Figure 4:
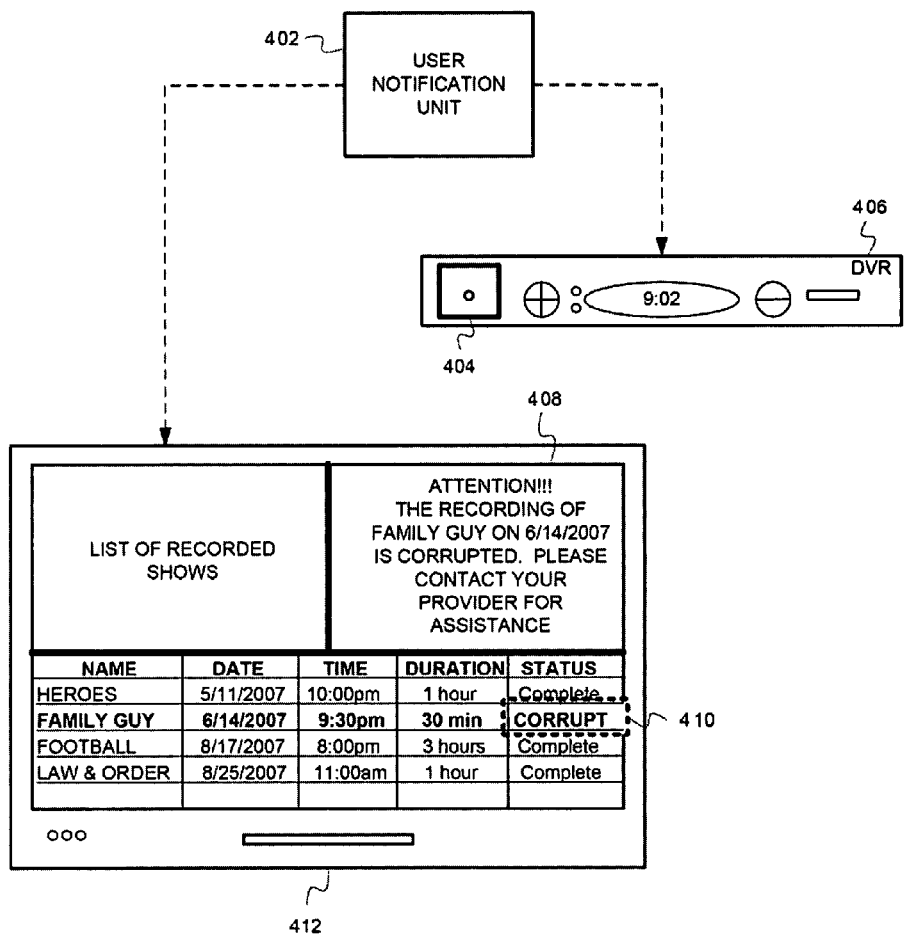
FIG. 4 illustrates an example of different types of user notification methods, according to an embodiment of the invention.

FIG. 4 illustrates how a user notification unit can notify users of corrupted recordings, according to some embodiments of the invention. In FIG. 4, the user notification unit 402 can notify users of corrupted recorded content via an indicator 404 on the DVR unit 406, pop-up screen 408 on the television (e.g., television screen, computer monitor, etc.), and/or icons in the recorded content list 410. For example, if the user notification unit 402 detects corrupted content, the user notification unit 402 can activate the indicator 404 on the DVR unit 406. In some embodiments the indicator 404 can flash, stay continuously lit, change color, etc. to alert users that some recorded content is corrupted. The user notification unit 402 can also notify users about corrupted content in other ways. For example, the user notification unit 402 can present a pop-up screen 408 that includes a message indicating what content is corrupted. The user notification unit 402 can present the pop-up screen 408 in concert with other information, such as program guides, listings of recorded content, etc. Additionally, the user notification unit 402 can present icons, text, or other indicia indicating that some recorded content is corrupted. For example, the user notification unit 402 can insert an indicator 410 in a listing of recorded shows, where the indicator 402 indicates that a particular show includes corrupted content. The indicator 402 can include text, graphics, symbols, etc. In some embodiments, the user notification unit 402 notifies users of corrupted content using sound, such as beeps, recorded messages, etc.

Figure 5:
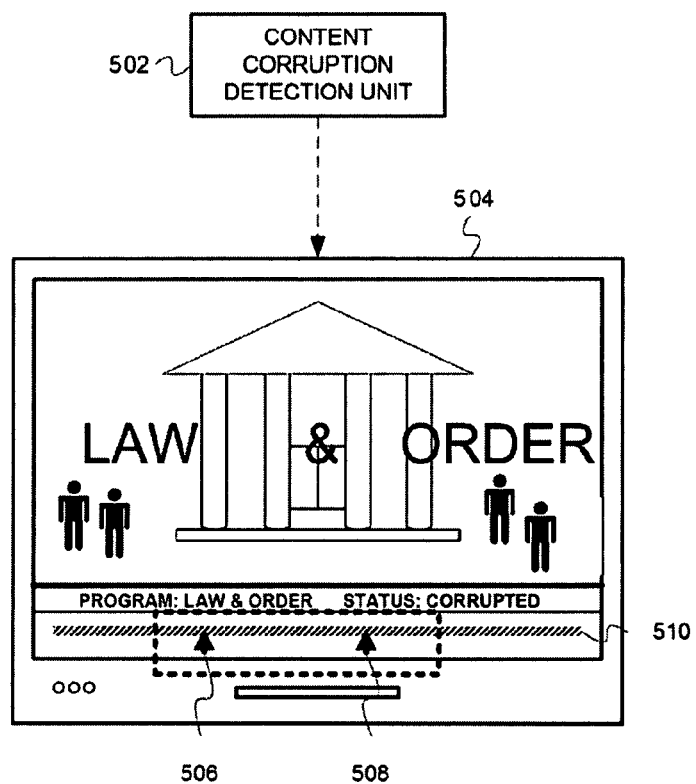
FIG. 5 illustrates an example of the user demarcation method of detecting corruption in recorded content in an embodiment of the invention.

FIG. 5 illustrates how users can identify segments of corrupted content through a graphical user interface, according to some embodiments of the invention. In this method for identifying corrupted content (a.k.a. the user demarcation method), the content corruption detection unit 502 can receive user input indicating what content is corrupted. In some embodiments, the content corruption detection unit 502 presents a graphical user interface 504 in which users can demarcate corrupted content. For example, the graphical user interface 504 can include a "strip" 510 representing the recorded content. The content corruption detection unit 502 enables users to mark points (506 & 508) on the strip 510. Content between the points (506 & 508) is corrupted. Users can identify corrupted content via a remote control or other suitable input devices. After the DVR unit's content corruption detection unit 502 identifies corrupted content, the DVR unit's content corruption correction unit can replace the corrupted content with uncorrupted content (see also discussion of FIG. 3).

Figure 6:
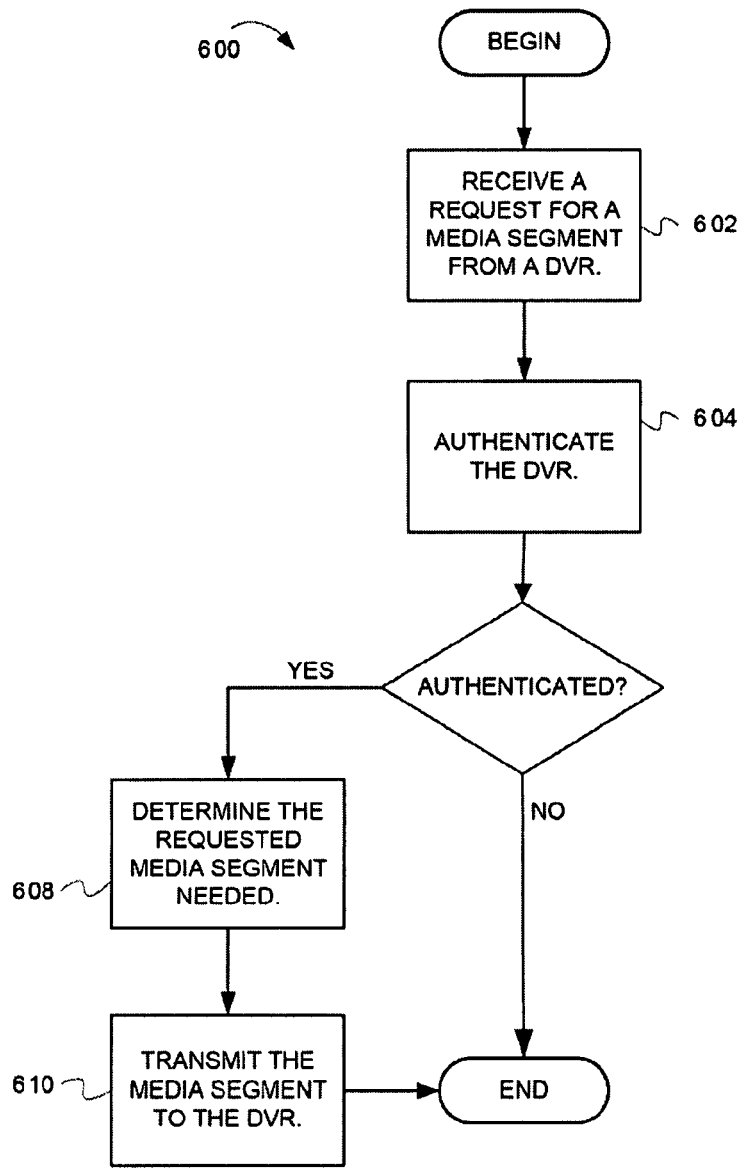
FIG. 6 depicts a flowchart illustrating the operation of the content provider providing, via the web, corrected content to the DVR unit containing corrupted content, according to an embodiment of the invention.

FIG. 6 is a flow diagram illustrating how a content provider provides, via the web, corrected content to the DVR unit containing corrupted content. The flow 600 will be described with respect to FIG. 1. In FIG. 6, flow 600 begins at block 602 where the content replacement service 112 receives, via the web, a request from the DVR unit 101 for a content segment. The request can identify a corrupted content segment by serial number, time stamps, a title and scene number, etc. The flow continues at block 604, where the content replacement service 112 authenticates the DVR unit 101. For example, the content provider can verify passwords, digital certificates, or other authentication credentials. Furthermore, the content provider may verify that the DVR unit 101 has subscribed for the content that it needs (e.g., if the request is for content of a premium channel, the requester must be subscribed to the premium channel). If the content replacement service 112 authenticates the DVR unit 101, the flow continues at block 608. Otherwise, the flow ends.

At block 608, the content replacement service 112 determines the requested content segment needed by the DVR unit 101. For example, the content provider 101 fetches the content segment from a local or remote content repository. The flow continues at block 610, where the content provider transmits the corrected content segment to the DVR unit 101. This transmission can be done over the World Wide Web, internet, telephony, satellite, and/or other suitable communication facilities. From block 610, the flow ends.

As noted above, a DVR unit can receive content from a satellite dish. In such embodiments, the DVR unit can tune the satellite dish to a particular channel by sending wireless signals (see FIG. 2). However, sometimes the wireless signals are errantly sent or errantly received. As a result, the satellite dish may tune to an incorrect channel. The incorrect channel may include "dead content" or undesired content (e.g., the wrong television show). This discussion continues with a description of embodiments in which a DVR unit can detect and recover from a situation in which it has recorded content from an incorrect channel.

Figure 7:
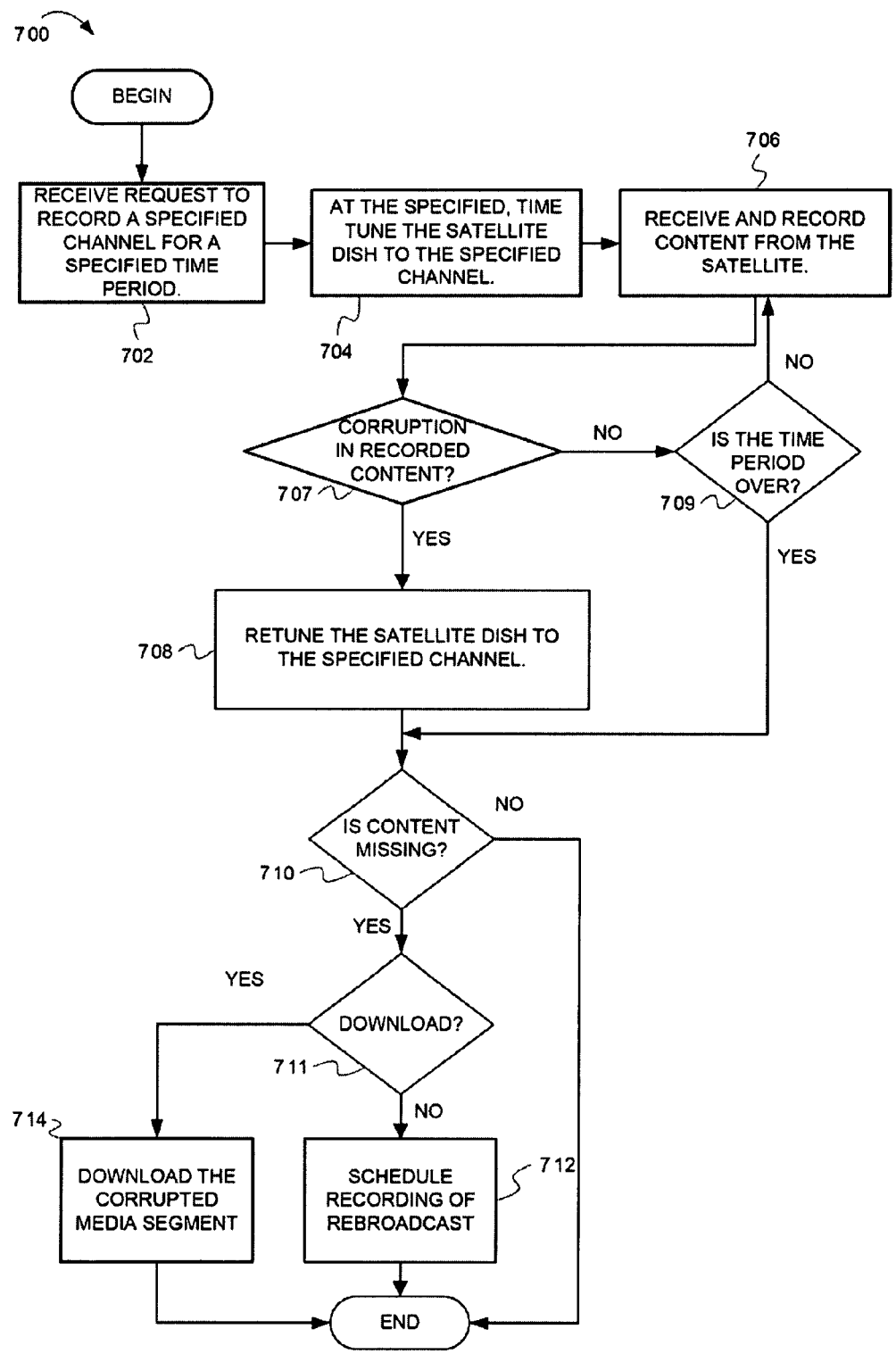
FIG. 7 depicts a flowchart illustrating the operations for retuning a satellite dish, according to some embodiments of the invention.

FIG. 7 illustrates operations for retuning a satellite dish, according to some embodiments of the invention. The flow 700 will be described with respect to FIG. 2. In FIG. 7, the flow 700 begins at block 702, where the DVR unit 201 receives a request to record a specified channel for a specified period of time. In some embodiments, the DVR unit 201 receives the request when a user selects a show from a menu of shows that are available for recording. The flow continues at block 704, where at the specified time, the DVR unit 201 tunes the satellite dish 216 to the specified channel. The flow then continues to block 706.

At block 706, the DVR unit 201 receives and records content from the satellite dish 216. The flow continues at block 707.

At block 707, the DVR unit 201 determines whether there is corruption in the recorded content. The DVR unit 201 can detect corruption in the content by monitoring pixels in the content. When monitoring pixels in the content, the DVR unit's content corruption detection unit 204 can check for changes in the pixels over a certain period of time. If the pixels do not change (or if changes are below a threshold), the content is corrupted. The content may be corrupted because the DVR unit 201 incorrectly tuned the satellite dish 216 to a channel that does not include broadcast content (at block 704). That is, although a user programmed the DVR unit 201 to tune the satellite dish 216 to a particular channel, the satellite dish 216 did not tune to that channel. Instead, the satellite dish 216 tuned to a different channel (e.g., because of errant wireless signals, etc.). Alternatively, the content may be corrupted for other reasons, such as poor signal quality, low signal strength, etc. In some embodiments, the DVR unit 201 can detect corruption in the content using any of the methods described above. If the DVR unit 201 detects corruption in the content, the flow continues at block 708. Otherwise, the flow continues at block 709.

At block 708, the DVR unit 201 retunes the satellite dish 216 to the channel specified in the request (see block 702). In some embodiments, the DVR unit 201 retunes the satellite dish 216 by transmitting wireless signals (e.g., infrared signals, radiofrequency signals, etc.) that cause the satellite dish 216 to tune to the originally desired channel. The flow continues at block 710.

At block 709, if the recording time period is not complete, the flow will return to block 706. If the recording time period is complete, the flow continues at block 710.

At block 710, the DVR unit 201 determines whether there is any content missing from the complete recording. If no content is missing, the flow ends. If content is missing, the flow continues at block 711. At block 711, the DVR unit 201 chooses whether to download content to replace the corrupted content segment. If the DVR unit 201 downloads content, the flow continues at block 714. Otherwise, the flow continues at block 712.

At block 712, the DVR unit 201 downloads content to replace the corrupted content. The DVR unit 201 can download from the content from a web enabled content repository via a web service, according to some embodiments of the invention (e.g., the content replacement service 210). In some embodiments, the DVR's content corruption correction unit 208 can alter the corrupted content by replacing corrupted segments with the downloaded segments. In other embodiments, the content corruption correction unit 208 can create metadata indicating when, during playback, to present the downloaded content segments. Therefore, the system 700 can seamlessly correct corrupted content using the downloaded content. From block 710, the flow ends.

At block 714, the DVR unit 201 schedules a recording of a rebroadcast of the original content. For example, since west coast broadcasts run hour(s) behind those in the east, the corrupt segment can be recorded during the west coast showing of the originally recorded content. Alternatively, the DVR unit 101 can analyze a content guide to discover if and when the content is being rebroadcasted and automatically record during that rebroadcast. Some embodiments may replace the entire recording, while others may opt to only rerecord the sections damaged in the original recording. From block 712, the flow ends.

Figure 8:
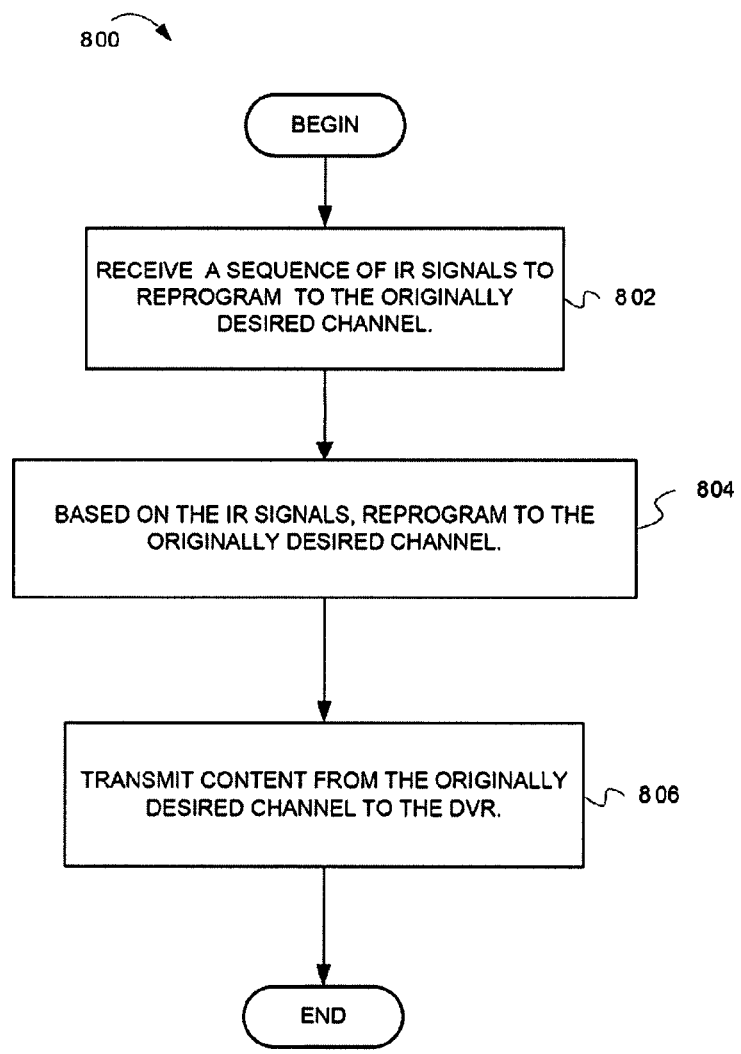
FIG. 8 depicts a flowchart illustrating the operations for reprogramming a satellite dish, according to some embodiments of the invention.

FIG. 8 illustrates operations for reprogramming a satellite dish, according to some embodiments of the invention. In FIG. 8, the flow 800 begins at block 802, where the satellite dish 216 receives a sequence of signals (e.g., infrared signals, radio frequency signals, etc.) to reprogram it to the desired channel. In some embodiments, the DVR unit 201 transmits IR signals via the wire 212, as shown in FIG. 2. The flow then continues to block 804.

At block 804, the satellite dish 216 reprograms to the channel indicated in the signals. The flow then continues to block 806, where the satellite dish 216 transmits content from the channel to the DVR 201. From block 806, the flow ends.

Other Embodiments

While the invention(s) is (are) described with reference to various implementations and exploitations, it will be understood that these embodiments are illustrative and that the scope of the invention(s) is not limited to them. In general, the techniques described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of recording video content by a digital video recorder (DVR), the method comprising:
    the DVR recording the video content provided from a content provider to produce recorded video content;
    the DVR computing a checksum corresponding to the recorded video content;
    the DVR determining that the recorded video content has been corrupted by a power outage by comparing a recording list of the DVR against a last known time the DVR was operational before a most recent startup of the DVR and by comparing a checksum received from the content provider with the computed checksum;
    the DVR determining a region of the recorded video content that is corrupted as occurring at the time period extending from the last known time the DVR was operational to a time at which the DVR resumed recording after the most recent startup of the DVR and by comparing a first rolling checksum computed on the region of the recorded video content to a rolling checksum computed on the region of the recorded video content and received from the content provider; and
    the DVR replacing the region of the recorded video content.

2. The method of claim 1, wherein the DVR replacing the region of the recorded video content comprises the DVR acquiring replacement content from the content provider.

3. The method of claim 1, wherein the DVR, further responsive to determining that the recorded video content has been corrupted, provides an indication that the recorded video content is corrupted to a user of the DVR.

4. The method of claim 3, wherein the indication is a symbol inserted in a program guide generated by the DVR.

5. The method of claim 3, wherein the indication is a pop-up generated by the DVR within a video output generated by the DVR.

6. The method of claim 3, wherein the indication is an audible indication inserted in an audio output generated by the DVR.

7. The program product of claim 1, wherein the replacing the region of the recorded video content comprises the DVR acquiring replacement content from the content provider.

8. The program product of claim 1, wherein the method further comprises:
  in response to the DVR determining that the recorded video content has been corrupted, the DVR providing an indication that the recorded video content is corrupted to a user of the DVR.

9. The program product of claim 8, wherein the indication is a symbol inserted in a program guide generated by the DVR.

10. The program product of claim 8, wherein the indication is a pop-up generated by the DVR within a video output generated by the DVR.

11. A digital video recorder (DVR), comprising:
  hardware for executing program instructions, a machine-readable memory and a machine-readable tangible storage device;
  program instructions, stored on the storage device for execution by the hardware via the memory, to record video content provided from a content provider to produce recorded video content;
  program instructions, stored on the storage device for execution by the hardware via the memory, to compute a checksum corresponding to the recorded video content;
  program instructions, stored on the storage device for execution by the hardware via the memory, to determine that the recorded video content has been corrupted by a power outage by comparing a recording list of the DVR against a last known time the DVR was operational before a most recent startup of the DVR and by comparing a checksum received from the content provider with the computed checksum;
  program instructions, stored on the storage device for execution by the hardware via the memory, to determine a region of the recorded video content that is corrupted as occurring at the time period extending from the last known time the DVR was operational to a time at which the DVR resumed recording after the most recent startup of the DVR and by comparing a first rolling checksum computed on the region of the recorded video content to a rolling checksum computed on the region of the recorded video content and received from the content provider determining that the recorded video content has been corrupted by comparing a checksum received from the content provider with the computed checksum; and
  program instructions, stored on the storage device for execution by the hardware via the memory, to replace the region of the recorded video content.

12. The DVR of claim 11, wherein the program instructions that replace the region of the recorded video content comprise program instructions to acquire replacement content from the content provider.

13. The DVR of claim 11, further comprising program instructions, stored on the storage device for execution by the hardware via the memory, to, in response to determining that the recorded video content has been corrupted, provide an indication that the recorded video content is corrupted to a user of the DVR.

14. The DVR of claim 11, wherein the indication is a symbol inserted in a program guide generated by the DVR.

15. The DVR of claim 11, wherein the indication is a pop-up generated by the DVR within a video output generated by the DVR.

16. The DVR of claim 11, wherein the indication is an audible indication inserted in an audio output generated by the DVR.

17. A program product comprising a non-transitory machine-readable device and machine-readable program instructions stored on the non-transitory machine-readable device for execution by a digital video recorder (DVR) to implement a method of recording video content by the DVR, the method comprising:
  the DVR recording the video content provided from a content provider to produce recorded video content;
  the DVR computing a checksum corresponding to the recorded video content;
  the DVR determining that the recorded video content has been corrupted by a power outage by comparing a recording list of the DVR against a last known time the DVR was operational before a most recent startup of the DVR and by comparing a checksum received from the content provider with the computed checksum;
  the DVR determining a region of the recorded video content that is corrupted as occurring at the time period extending from the last known time the DVR was operational to a time at which the DVR resumed recording after the most recent startup of the DVR and by comparing a first rolling checksum computed on the region of the recorded video content to a rolling checksum computed on the region of the recorded video content and received from the content provider; and
  the DVR replacing the region of the recorded video content.

* * * * *